US 9,264,551 B2

(12) United States Patent
Wisman (10) Patent No.: US 9,264,551 B2
(45) Date of Patent: Feb. 16, 2016

(54) COLLABORATING WITH A CALLER BY INTERNET SITES

(75) Inventor: Oren Wisman, Herzliya (IL)

(73) Assignee: LikeBillions Ltd. (IL)

( * ) Notice: Subject to any disclaimer, the term of this patent is extended or adjusted under 35 U.S.C. 154(b) by 0 days.

(21) Appl. No.: 13/603,467

(22) Filed: Sep. 5, 2012

(65) Prior Publication Data

US 2013/0279670 A1   Oct. 24, 2013

Related U.S. Application Data

(63) Continuation-in-part of application No. 13/454,101, filed on Apr. 24, 2012.

(51) Int. Cl.
*H04M 11/06* (2006.01)
*H04M 7/00* (2006.01)

(52) U.S. Cl.
CPC .................................. *H04M 7/0027* (2013.01)

(58) Field of Classification Search
USPC ........... 705/1, 7, 14, 26, 27, 37; 709/217, 229
See application file for complete search history.

(56) References Cited

U.S. PATENT DOCUMENTS

| 7,120,235 | B2 | 10/2006 | Altberg et al. | |
| 7,411,939 | B1 | 8/2008 | Lamb et al. | |
| 8,306,202 | B2 | 11/2012 | Citron et al. | |
| 2006/0265259 | A1* | 11/2006 | Diana et al. | 705/7 |
| 2006/0277108 | A1* | 12/2006 | Altberg et al. | 705/14 |
| 2007/0061475 | A1* | 3/2007 | Moissinac et al. | 709/229 |
| 2007/0100956 | A1* | 5/2007 | Kumar | 709/217 |
| 2007/0271110 | A1* | 11/2007 | Van Der Linden et al. | 705/1 |
| 2008/0065501 | A1 | 3/2008 | Stuart et al. | |
| 2008/0267377 | A1 | 10/2008 | Siegrist | |
| 2010/0223183 | A1 | 9/2010 | Smith | |
| 2012/0158528 | A1* | 6/2012 | Hsu et al. | 705/16 |
| 2012/0179524 | A1* | 7/2012 | Altberg et al. | 705/14.7 |

* cited by examiner

*Primary Examiner* — Joseph J Nguyen
(74) *Attorney, Agent, or Firm* — Intrinsic Law Corp.; Ibrahim M. Hallaj (57) ABSTRACT

A computerized method for collaborating between a party and a caller, comprising receiving at the party a communication from the caller, and responsive to the communication, presenting by the party a web-page on a computer operated by the caller, wherein the method is performed at least by a computerized apparatus of the party and an at least one communications apparatus of the caller.

19 Claims, 7 Drawing Sheets

Fig. 6

COLLABORATING WITH A CALLER BY INTERNET SITES

RELATED APPLICATIONS

The present application is a continuation-in-part of U.S. application Ser. No. 13/454,101 filed on Apr. 24, 2012.

BACKGROUND

The present disclosure generally relates to tracking of a call, and more specifically to interacting responsive to a communication call.

Tracking of phone call according to a displayed telephone-number is known in the art. Some exemplary publications are U.S. Pat. Nos. 7,120,235, 7,505,920, 7,555,106 or International application WO2005/086980.

Some web sites also relate to tracking a phone call, for example, http://paypercall.attinteractive.com/default.aspx, http://avidtrak.com/avidtrak, http://thenextweb.com/2010101/05/google-launching-pay-per-call-mobile-ads.

SUMMARY

One exemplary embodiment of the disclosed subject matter is an apparatus for tracking a telephone call comprising a service facility comprising an at least one processor, the service facility is connectable to and interactable with an at least one computer, and configured to provide the at least one computer information related to a status a phone call with a telephone-number delivered to the at least one computer by way of a program provided by the service facility.

Another exemplary embodiment of the disclosed subject matter is an apparatus for tracking a telephone call, comprising a service facility comprising an at least one processor, the service facility is connectable to and interactable with an at least one computer, and a branch exchange that is connectable to the service facility.

Yet another exemplary embodiment of the disclosed subject matter is a computerized method for collaborating between a party and a caller, comprising receiving at the party a communication from the caller, and responsive to the communication, presenting by the party an at least one web-page on a computer operated by the caller, wherein the method is performed at least by a computerized apparatus of the party and an at least one communications apparatus of the caller.

In the context of some embodiments of the present disclosure, without limiting, a web-page or a web-site implies one or more documents residing on a server or on and/or any other apparatus, wherein the web-page or web-site contents is at least partially accessible such as for viewing, and optionally comprises data such as an executable code and/or links to other data of files or documents, for instance as URL. The server or any apparatus storing or hosting the advertiser's web-page is also referred to as a host.

In the context of some embodiments of the present disclosure, without limiting, a party implies an organization and/or a business and/or a person and/or a group of persons and/or any establishment or society.

For clarity and brevity, in the context of some embodiments of the present disclosure, without limiting, an advertiser implies a party having a telephone and/or other communication capabilities for receiving calls and/or other communications by the advertiser and/or on behalf thereof.

For brevity, without limiting and unless otherwise specified, referring to an advertiser implies also a party operating for and/or on behalf of and/or associated or affiliated with the advertiser.

An advertiser's web-site or an advertiser's host refers, respectively and without limiting, to a web-site or a host of and/or on behalf of an advertiser and/or controlled and/or affected by the advertiser.

In the context of some embodiments of the present disclosure, without limiting, a client computer implies a computer linked to the host and operated by a user executing a browser, wherein the browser implies, without limiting, a program operative to communicate with the host and present contents of the advertiser's web-page.

In the context of some embodiments of the present disclosure, without limiting, a branch exchange implies an apparatus for receiving telephone calls and routing the calls to telephones, such as a Private Branch Exchange (PBX), where the branch exchange is connectable to another device and interrogable about received and, at least optionally, routed phone calls.

In the context of the present disclosure, without limiting, a service facility implies one or more computers configured at least for tracking telephone calls via a telephone branch exchange and for interacting with client computers, generally the client computers are remote to the service facility and connected to the service facility by communication link.

In the context of the present disclosure, without limiting, the term 'query' is used to denote any message sent from a first device to a second device, and the term 'response' denotes any message sent back from the second device to the first device.

For clarity and brevity, in the context of some embodiments of the present disclosure, without limiting, 'of' something such of an advertiser implies also 'on behalf' of something such as, respectively, on behalf of an advertiser.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

DETAILED DESCRIPTION

One technical problem dealt by the disclosed subject matter is interacting with a web-site responsive to a telephone call suggested or prompted by the web-site.

One technical solution according to the disclosed subject matter comprises a service facility linked to a telephone branch exchange, and a server operating on behalf of an advertiser and hosting an advertiser's web-page accessible by a client computer. The advertiser's web-page is configured by the service facility to provide data that include contact data for reaching the service facility.

Responsive to accessing the advertiser's web-page by a user operating the client computer, the client computer obtains from the advertiser's web-page the contact data to reach the service facility. By using the contact data, a communication link is established between the service facility and the client computer, and indirectly with the advertiser's web-page via the client computer operative as a relay.

The communication link between the service facility and the client computer are also referred to as update-link or feedback-link. The indirect communication link between the service facility and the advertiser's web-page are also referred to virtual link or relay link.

In some embodiments, responsive to accessing the advertiser's web-page by the client computer, the advertiser's web-page responds by providing a program executable on the client computer and communicable with the service facility. Alternatively, using the update-link with the service facility, the client computer obtains the program from the service facility.

Using the program, the client computer sends via the update-link a request to the service facility for a telephone number. The service facility responds by sending a unique telephone number pertaining to the advertiser's web-page as displayed on the client computer.

It is noted that in case a plurality of client computers concurrently access the advertiser's web-page and display contents thereof, each client computer would receive a telephone-number different from the others.

In some embodiments, using the program the client computer inserts or updates the telephone number in the displayed contents of the browser, such as amending data contents related to display that were downloaded from the advertiser's web-page. Alternatively, the client computer sends the number to the advertiser's web-page that updates the number in the contents of the web-page, consequently updating the number presented in the browser of the client computer.

Once the user calls the presented number, such as by a telephone by the user's location, the call reaches the telephone branch exchange which directs the call to a telephone at the location of the advertiser. The service facility is informed, by cooperating with the telephone branch exchange, that the number was called. The service facility further obtains or incorporates information pertaining to the advertiser and/or the advertiser's web-page and/or the client computer. For example, using the address of the client computer the service facility is informed about the locality from which the phone was called subsequently to presenting the telephone number on the client computer.

Using the program the client computer further periodically queries the service facility whether the call is active. Responsively, the service facility interacts with the client computer and/or with the advertiser's host via the client computer. For example, sending or invoking a message on the client computer to the effect that the telephone call was indeed carried out or about the duration thereof.

In some embodiments, the interaction is modified and/or extended allowing the advertiser to update the advertiser's web-page responsive to the telephone call suggested or prompted by the web-site. The advertiser may be connected to the service facility and update the web-page via the relay link. Alternatively, the advertiser may be connected to the advertiser's host via a different and/or additional link, denoted as an advertiser link, and update the web-page via the advertiser link. Further alternatively, the web-page may be updated by an entity operation on behalf of the advertiser.

For example, responsive to the telephone call the advertiser modifies the web-page such as by a purchase form that appears in the browser on the client computer. The form may be filled and/or acknowledged by the user, wherein the form may be pre-filled with details previously supplied by the user.

It is noted that the client computer may be, in some embodiments, a telephonic device such as a smartphone as known in the art and/or industry, or any other telephonic and/or communication device having a touch-screen such as a tablet device with telephonic capabilities.

In some embodiments, an advertiser's web-page is identified by one or more keywords, such as by a search engine.

Using the aforementioned apparatus, once a user accesses the advertiser's web-page, the client computer, by way of the program or interaction with the web-page, obtains the keywords and forwards them to the service facility via the client computer using the virtual link and/or the update link.

Thus, the information of the service facility relating to the advertiser and/or the advertiser's web-page and/or the client computer is enriched with the relevant keywords that were used to identify the advertiser's web-page.

Furthermore, the information may be provided to one or more services and/or computers such as an analytics service, for example, Google Analytics (© Google Inc.).

According to the description above, the apparatus enables to correlate two independent and unrelated operations—viewing a web-site and a conducting a phone call—into a coherent interactive process.

A potential technical effect of the disclosed subject matter is displaying a phone number on a computer and interacting with the computer with respect to an independent phone call with or by the phone number.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

Figure 1:
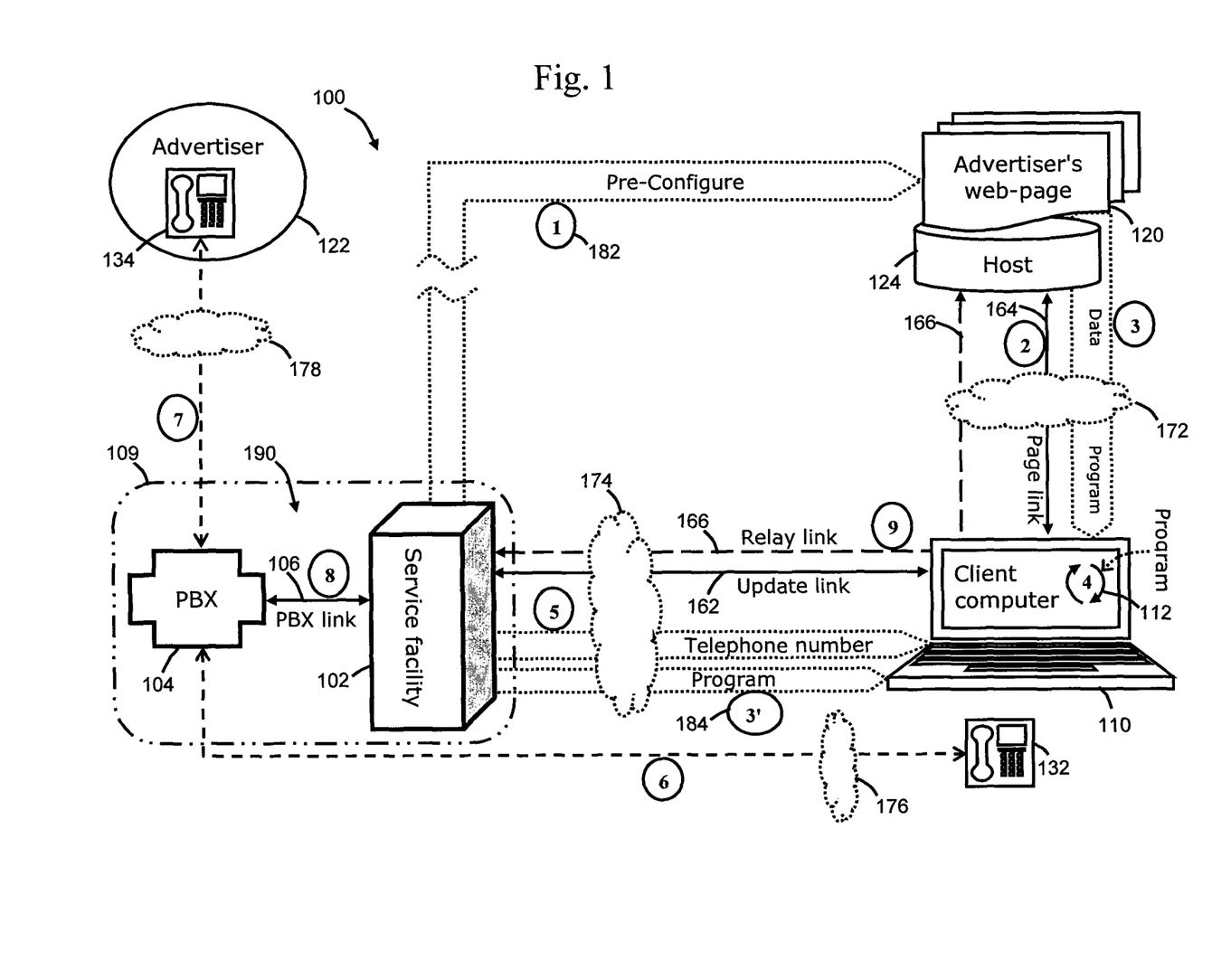
FIG. 1 diagrammatically illustrates an overall view of a scheme for correlating a phone call with a displayed telephone-number, according to exemplary embodiments of the disclosed subject matter.

FIG. 1 diagrammatically illustrates an overall view of a scheme 100 for correlating a phone call with a displayed telephone-number, according to exemplary embodiments of the disclosed subject matter.

Scheme 100 comprises an apparatus 190, framed in a frame 109, provided by a vendor for carrying out a correlation between a phone call and a displayed telephone-number. For brevity, the correlation between a phone call and a displayed telephone-number is also referred to, without limiting, as the 'correlation'.

Apart of apparatus 190, the other units and/or entities and/or elements of scheme 100 are existing and/or potential units with which apparatus 190, and/or an entity on behalf of apparatus 190, interacts directly and/or indirectly. For brevity and without limiting, the other units and/or entities and/or elements of scheme 100 are also referred to collectively as the 'environment'.

Each of a cloud shape 172 and a cloud shape 174 represents a communication link such as a network link or a link via the internet. For brevity and without limiting, the communication link is referred to as a web-link. Each of a cloud shape 176 and a cloud shape 178 represents a telephone network or interconnection.

For convenience, operations involved in the correlation are indicated by circles with numbers depicting an exemplary order of the correlation, denoted herein as (n) where 'n' stands for an ordinal number. For example, circle 182 indicating an exemplary initial operation (1), or circle 184 (3') indicating an alternative operation to at least a part of operation (3).

Apparatus 190 comprises a service facility 102, comprising one or more processors, service facility 102 connectable to and interactable with an at least one computer, denoted a client computer 110. The computer is generally remote from service facility 102, and is denoted also a remote computer.

Apparatus 190 further comprises a telephone branch exchange, such as private branch exchange (PBX), denoted as branch exchange 104. Branch exchange 104 maintains a plurality of telephone-numbers and/or branch exchange 104 is connectable to one or more branch exchanges at various locations and/or branch exchange 104 is connectable to one or more public telephone service.

A telephone-number that can reach branch exchange 104 is referred to, without limiting, as a telephone-number of branch exchange 104, and also as telephone-number unless otherwise specified or clearly evident by a context.

Branch exchange 104 is linked to or coupled with service facility 102 by a communicating link, denoted as a PBX link 106. Service facility 102 can interrogate, or poll, branch exchange 104 about a phone call by a telephone-number of branch exchange 104. For example, whether a call is conducted, and/or about the length of the call and/or about any data or parameters of the call. Optionally or alternatively, branch exchange 104 can notify or signal to service facility 102 about a phone call by a telephone-number of branch exchange 104.

The environment comprises an organization, referred herein also as an advertiser, such as an advertiser 122. The advertiser or an organization operating on behalf thereof, such as a call center, has a telephone, denoted as an advertiser-telephone 134, that can be reached by branch exchange 104.

The environment comprises a web-page of the advertiser and/or on behalf of the advertiser, denoted as an advertiser's web-page 120, residing on a host computer, denoted as host 124.

As discussed below, service facility 102 communicates with client computer 110 by a communication link, denoted as an update link 162. Client computer 110 communicates with advertiser's web-page 120 and/or host 124 by communication link, denoted as a page link 164. Service facility 102 communicates indirectly, via client computer 110 as a relay, with advertiser's web-page 120 and/or host 124 by communication link, denoted as a relay link 166. The communications is performed according to mutual protocols such as HTTP or FTP.

Service facility 102 or an agent or other entity operating on behalf thereof configures advertiser's web-page 120 (1). Advertiser's web-page 120 is configured with data and/or software operative responsive to accessing advertiser's web-page 120 by a web-link, thereby sending data and/or a program responsive to the access. Advertiser's web-page 120 is configured such as by sending or otherwise providing the data and/or software to the advertiser or an entity or agent operative on behalf thereof. Consequently, the advertiser or an entity or agent operative on behalf of the advertiser installs the data and/or software in the advertiser's web-page 120 and/or host 124.

The data and/or software comprise data that include contact data for reaching service facility 102 and, optionally, a program operable on client computer 110.

Subsequently at a later time the following scenario potentially and/or actually is conducted.

Operated by a user, client computer 110 accesses advertiser's web-page 120 via page link 164 by using an appropriate application such as a web browser, collectively denoted, without limiting, as a browser. For example, the user provides a search engine with keywords and activates the search engine via client computer 110, thereby presenting advertiser's web-page 120 on the browser in case advertiser's web-page 120 was identified by the search engine.

Responsive to accessing (2) advertiser's web-page 120, host 124 sends contents of advertiser's web-page 120 to client computer 110, and further sends (3) data that include the contact data for reaching service facility 102 and, optionally, a program that executes on client computer 110, such as in conjunction with or within the framework of a browser operating thereon (4). The executing program is indicated schematically as a program 112.

In some embodiments, the program is a script such as JavaScript (ORACLE AMERICA, INC.) or the program is operative by other techniques or frameworks or plug-in technologies such a Flash (Copyright© 2012 Adobe Systems Incorporated) or ActiveX (Microsoft Corporation).

Having received contact data for reaching service facility 102, client computer 110 accesses service facility 102 via update link 162, thereby indicating that a telephone-number is required. Furthermore, at least optionally, client computer 110 provides to service facility 102 information about the locality of client computer 110. The locality of client computer 110 may be determined, for example, by the IP address thereof, or by other means such as GPS, or spotting by a cellular provider, or by manual entry by a user of client computer 110. Optionally or alternatively, the locality of client computer 110 may be reported to service facility 102 within a query from client computer 110. Optionally or alternatively, service facility 102 determines the locality of client computer 110, such as by the IP thereof as revealed in a communication protocol such as TCP/IP.

In response, service facility 102 sends (5) to client computer 110 a telephone-number reachable to and/or maintained by branch exchange 104.

The telephone-number is determined and/or selected such as to be distinctive and unique to the display of advertiser's web-page 120 on client computer 110, and further with respect to other displays of advertiser's web-page 120 on other computers potentially connected or actually connected to service facility 102.

In some embodiments, the determination of the telephone-number is, for example, by the availability of telephone-numbers, the locality of client computer 110, or by other criteria such as cost or a medium by which the call is transferred.

The telephone-number of branch exchange 104 is reserved or allocated as unique or distinct to advertiser's web-page 120 as displayed on client computer 110 at least for a certain time interval. For example, until a phone call by the telephone-number is made and finished, or until a pre-set or a determined time interval has elapsed in which no call by the telephone-number is made.

The telephone-number is optionally incorporated in data of client computer 110, such as in the source data of advertiser's web-page 120 sent to client computer 110. Alternatively, client computer 110 sends via relay link 166 the telephone-number to advertiser's web-page 120 which incorporates the telephone-number therein, such as by a program configured therein, and consequently sends the updated page or a part thereof to client computer 110. Either way, the telephone-number is displayed on client computer 110 by the browser.

In an alternate embodiment, instead of host 124 sending (3) the program to client computer 110, service facility 102 sends the program responsive to accessing service facility 102 by client computer 110 (3').

By or at the vicinity of client computer 110 the user has an access to a telephone, denoted as user-telephone 132.

Prompted by the displayed telephone-number, the user dials or otherwise activates user-telephone 132 (6), thereby the call reaches branch exchange 104. Responsively, branch exchange 104 directs or routs (7) the call to advertiser-telephone 134.

Meanwhile, client computer 110 queries service facility 102, via update link 162, about the status of a phone call by the telephone-number. Responsively, service facility 102 interrogates branch exchange 104 via PBX link 106 whether a call has reached branch exchange 104 and/or the time and/or duration of the call and/or other information such as the number of advertiser-telephone to which the call was routed. Consequently, service facility 102 responds via update link 162 and provides client computer 110 with information of and/or related to the status of the call (9). For example, using the program operating in and/or on client computer 110, information of the call is displayed by the browser, such as call duration or destination number of advertiser-telephone. Optionally or additionally, the program, according to the status, invokes a notification message such as acknowledgement of receiving the call and/or in case no call was made a message prompting the user to call.

Optionally, client computer 110 queries service facility 102 repeatedly, such as periodically, thereby service facility 102 repeatedly updates client computer 110 on the status of the call or otherwise to that effect. For example, client computer 110 queries service facility 102 every about 5 seconds or every other interval, the interval predetermined or dynamically determined such as according to the phone call status reported to client computer 110.

Generally, without limiting, client computer 110 and service facility 102 use codes or other constructs to indicate what is requested and what is responded, wherein the program in client computer 110 is operative to handle the information exchange and resultant operations.

In some embodiments, in responding to queries from client computer 110, service facility 102 sends updates to the program in client computer 110 and affects, such as by a code, updating or modifying the program in client computer 110 and/or data used by the program such as operational parameters.

In some embodiments, such as after a phone call with the telephone-number was made and/or after a certain time interval after a call is made, in responding to queries from client computer 110, service facility 102 affects, such as by a code, disabling and/or deactivating of the program in client computer 110.

It is noted that displaying on client computer 110 advertiser's web-page 120 with the telephone-number is, essentially, and independent operation not related whatsoever to a user making a phone call, and making a phone call is, essentially, not related whatsoever to displaying advertiser's web-page 120.

Nevertheless, by using apparatus 190 operating as described in the scenario above, displaying advertiser's web-page 120 with the telephone-number on one hand, and a phone call, or lack thereof, with the telephone-number on the other hand, are automatically correlated, providing feedback about the call to client computer 110 and, correspondingly, to the user operating and/or viewing client computer 110.

FIGS. 2A-2D schematically illustrate feasible displays, prompting a phone call and related feedback, according to exemplary embodiments of the disclosed subject matter.

Figure 2A:
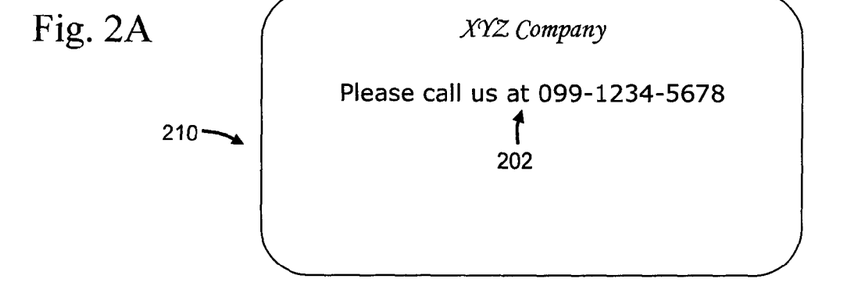
FIGS. 2A-2D schematically illustrate feasible displays, prompting a phone call and related feedback, according to exemplary embodiments of the disclosed subject matter.

FIG. 2A illustrates a screen 210 of a browser at client computer 110 prompting to call a telephone-number as indicated by a message 202.

Figure 2B:
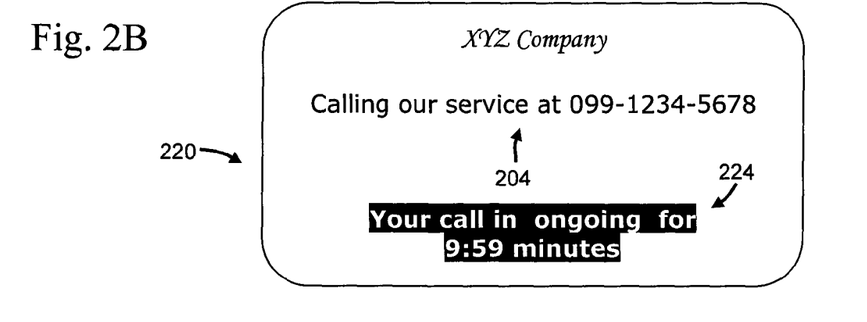

FIG. 2B illustrates a screen 220 of a browser at client computer 110 when a call is conducted with the prompted telephone-number, the prompt changed from screen 210 as indicated by a message 204 and further providing the user by a message 224 a feedback that the call is active and for the duration thereof.

Figure 2C:
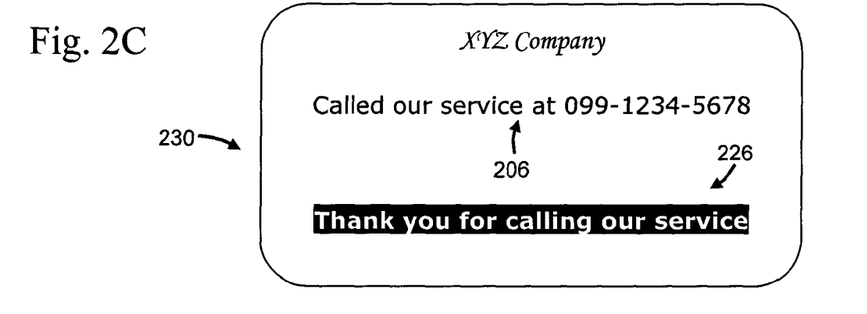

FIG. 2C illustrates a screen 230 of a browser at client computer 110 when a call with the prompted telephone-number was conducted and ended, the prompt changed from screen 220 as indicated by a message 206 and further providing the user by a message 226 a feedback that the call was conducted and ended, optionally if the call was conducted for a determined or pre-determined time interval.

Figure 2D:
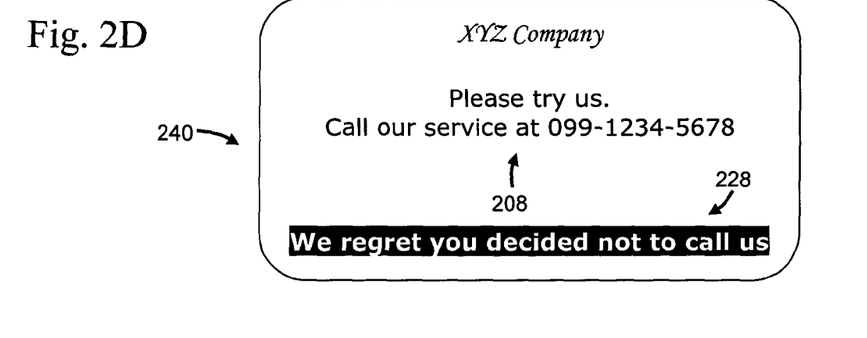

FIG. 2D illustrates a screen 240 of a browser at client computer 110 when a call with the prompted telephone-number was not conducted, the prompt changed from screen 210 as indicated by a message 208 and further providing the user by a message 228 a feedback that the call was not conducted, optionally after displaying of screen 210 for a determined or pre-determined time interval.

In some embodiments, screen 240 is presented in case the phone call was tried but did not last for a determined or pre-determined time interval.

In some embodiments, or cases, a phone call may fail such as disconnected and/or reaching a busy end or a non-existent telephone, optionally after a plurality of trials and/or after a determined or pre-determined time interval. In some embodiments, in case the phone call was tried and failed the screen may change with a message and/or display to this effect and, optionally, a different number is presented and prompted. Optionally, the different number is a direct number of advertiser-telephone 134 and/or an alternative thereof, such as another telephone-number of an extension or another extension or a telephone-number of an affiliate of the advertiser. In some embodiments, the direct number of advertiser-telephone 134 is always displayed on client computer 110 in addition to the telephone-number provided by service facility 102.

The time intervals with respect to FIGS. 2A-2D above are either pre-set such as according to expected behavior of callers. Optionally or additionally, the time interval are determined dynamically according to behavior history or statistic and/or based on the activity of callers. For example, if a call is started but the destination is busy or the call is terminated abruptly, a larger time interval is allowed.

In some embodiments, using update link 162 and/or relay link 166, service facility 102 obtains or fetches information from advertiser's web-page 120 and/or provides or supplies information to advertiser's web-page 120.

As one example, in a response to a query from client computer 110, service facility 102 responds with data indicating to client computer 110 to access advertiser's web-page 120 for information, and subsequently sending the information to service facility 102 within a query thereto. As another example, in a response to a query from client computer 110, service facility 102 responds with information and data indicating client computer 110 to access advertiser's web-page 120 and query the latter and provide the information thereto.

In some embodiments and/or cases, advertiser's web-page 120 identified by a search engine is provided by the search engine with the keywords used to identify advertiser's web-page 120. Accordingly, in some embodiments, by way of relay link 166 service facility 102 fetches the keywords from advertiser's web-page 120. It is noted that referring to keywords implies also one keyword and any combination of keywords.

In some embodiments, service facility 102 supplies advertiser's web-page 120 with information such as pertaining to the phone call. Optionally, by using software configured in advertiser's web-page 120, advertiser's web-page 120 may use the data such, for example, collecting and storing history of phone calls.

In some embodiments, service facility 102 collects and data pertaining to the phone call and/or advertiser's web-page 120, and incorporates the data in some structure such as in a database. The data comprises, for example, call start time and end time, telephone-number or user-telephone 132 and keywords used to identify advertiser's web-page 120.

In some embodiments, service facility 102 analyses the data and sends reports to advertiser 122. Optionally or alternatively, service facility 102 provides the data to an analytics service that, consequently, may send reports to advertiser 122.

In some embodiments, at least a part of the program is executed in service facility 102 and/or advertiser's web-page 120 and/or host 124, transferring data via update link 162 and/or page link 164 and/or relay link 166.

In some embodiments, a 'live' recurring takes place between service facility 102 and client computer 110, based on repeated queries by client computer 110 and corresponding responses from service facility 102. The rate of the queries may be pre-set and/or responsive to updates from service facility 102. Exemplary rate is every about 1 second or every about 3 seconds or about 5 seconds or every any other time interval.

Optionally or additionally, in some embodiments, a temporary link may be established between service facility 102 and client computer 110 such that service facility 102 may initiate updates for client computer 110. For example, after an initial query, the program interacts with service facility 102 and sets up a link operating according to a particular protocol or rules that allows service facility 102 to directly interact with the program not necessarily limited to a response to a query.

In some embodiments, the interaction and/or interactions such as described above is or are varied and/or modified and/or extended providing for a variety of collaborations between a caller or a user and the advertiser.

In some embodiments, the advertiser updates the advertiser's web-page responsive to the telephone call from a user by a telephone number suggested or prompted by the web-site such as in a preliminary web-page, where the telephone number identifies and/or associates and/or distinguishes the user. Optionally, during the telephone call the user supplies information to the advertiser such as some personal details thereof and/or other data such as for a product to be purchased. Optionally or additionally, the advertiser provides the user with information such as suggestions for purchase of product details, where, optionally, the user does not provide information to the advertiser.

For example, responsive to the telephone call and optionally responsive to information transferred between the advertiser and the user, the advertiser modifies the advertiser's web-page such as by a purchase form and/or any presentation of data that appears in the browser on the client computer. The form or other presentation may be filled and/or updated and/or acknowledged by the user, wherein the form or presentation may be pre-filled or arranged with details previously transferred between the advertiser and the user.

In some embodiments, the advertiser is connected to the service facility and updates the web-page via the relay link. Alternatively, the advertiser is connected to the advertiser's host via a different and/or an additional link, denoted as an advertiser link, and updates the web-page via the advertiser link. Further alternatively, the web-page may be updated by a party operating on behalf of or associated with the advertiser.

In some embodiments, the interaction or collaboration between the advertiser and the user involves feedback indication such as to the effect that data was read or handled.

Furthermore, in some embodiments, the collaboration or interaction between the advertiser and the user involves a plurality of phases, either directly such as in the telephone call and/or indirectly such as via the advertiser's web-page. In some embodiments, the user interacts with one or more web-pages in a plurality of phases, optionally comprising repetitions of one or more interactions.

For example, responsive to a call by the user the advertiser presents the user a web-page with an assortment of products. The user selects a group of products and the advertiser queries the user for a particular product, optionally presenting details of the products and/or directing the user to a web-page where the user may find more information such as multimedia presentations of the product. Consequently a purchase and/or transaction is performed between the user and the advertiser or a party associated with the advertiser, optionally responsive to a confirmation or an acknowledgment or feedback from the user via a web-page and/or call to the advertiser or a party operating on behalf of or associated with the advertiser.

In some embodiments, instead of and/or in addition to the telephone call, the advertiser updates the advertiser's web-page responsive to a communication from the user, such as by VoIP call, email, instant messaging, online chat or a combination thereof or by any other communication technique. The user is identified or distinguished by one or more data items such as a code and/or name sent of otherwise delivered to the advertiser.

In some embodiments, instead and/or in addition to updating the advertiser's web-page the advertiser directs and/or links the user to a web-page other than the advertiser's web-page and/or to documents such as multimedia files residing on different apparatus or host other than the advertiser's host. In some embodiments, the advertiser directs and/or links the user by way of the advertiser's web-page and/or by other techniques such as by links transmitted or delivered to the user.

In some embodiments, the interaction or collaboration between the advertiser and the user do not concern commercial relations such as for a purchase of products or services, but, optionally or additionally, other interactions. For example, interactions for social events or for community updates or payments for taxes or any other interaction.

Figure 3A:
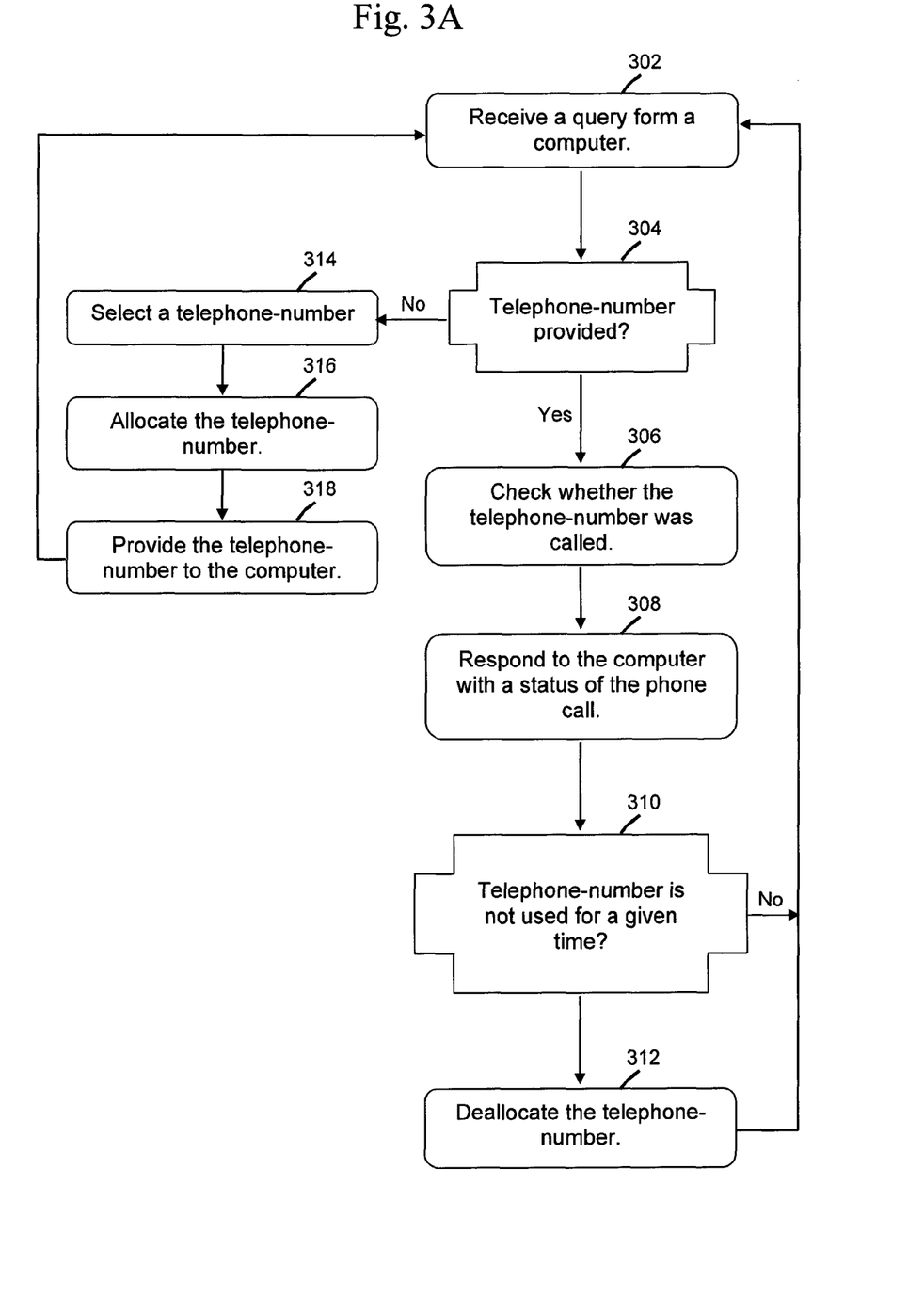
FIG. 3A outlines operations by the service facility, according to exemplary embodiments of the disclosed subject matter.

FIG. 3A outlines some operations by the service facility, such as service facility 102, according to exemplary embodiments of the disclosed subject matter.

Generally, the service facility waits for queries, such as from a computer, the computer generally, without limiting, remote from the service facility.

At operation 302 the service facility receives a query from a computer, such as client computer 110.

In some embodiments, the computer notifies the service facility of the identity thereof. Optionally or alternatively, the service facility determines the identity of the computer such by the IP thereof.

At operation 304 the service facility checks whether a telephone-number was sent to the computer, at least recently such as within a determined or pre-determined time interval.

In case a telephone-number was not sent, at least not recently such as within a determined or pre-determined time interval, in operation 314 the service facility selects a unique or distinctive telephone-number for the computer, as discussed in more details below with respect to FIG. 3B. Optionally or additionally, the service facility provides the computer with other data such as a unique data, akin to a password, for identifying and/or augmenting the identification of the computer in further interactions with the service facility.

At operation 316 the service facility allocates the telephone-number for the computer, at least for a determined or pre-determined time interval. Consequently, in operation 318, the service facility provides the computer with the telephone-number such as in a response to the query. Subsequently the service facility waits for further queries from the computer.

In case a query from the computer is received after a telephone-number was sent to the computer, at least recently such as within a determined or pre-determined time interval, in operation 306 the service facility determines the status of the phone call with the telephone-number. For example, whether a phone call by the telephone-number was made. In some embodiments, the service facility determines the status of the phone call by interrogating a branch exchange to which the phone call is configured to reach. The status of the phone call may comprise an indication that no call was made so far, or that the call is made, where the status may comprise the time of an ongoing call.

In operation 308 the service facility responds to the query back to the computer with the status of the phone call.

In operation 310 the service facility determines if the phone call is not active for a pre-determined or determined time interval, such as that no phone call was made with the telephone-number or the phone call was terminated.

If the phone call is still active, the service facility waits for further queries from the computer. Otherwise, in operation 312 the service facility deallocates the telephone-number, freeing the telephone-number to be optionally and/or potentially used by other computers or for other uses.

Optionally the service facility overriding the number or deletes the telephone-number from the computer such as by an indication to this effect in a response to a query from the computer. For example, upon receiving the indication the computer, such as by a program executing therein, deletes or overrides the number preciously provided.

Subsequently, the service facility marks that no telephone-number is provided for the computer and the service facility waits anew for queries from a computer.

The time intervals with respect to FIG. 3A above are either pre-set such as according to expected behavior of callers. Optionally or additionally, the time interval are determined dynamically according to behavior history or statistic and/or based on the activity of callers. For example, if a call is was made and is over the time interval is shorter than the time interval for waiting for a call.

It is noted that the service facility may handle and respond to a plurality of calls, operating correspondingly with the querying computers, such as according to the identity of the querying computers and/or the telephone-number provided thereto and/or according to a unique code provided to and/or a computer. In some embodiments, a separate execution thread is assigned for each querying computer and/or other programming methods may be employed event driven operation where a query triggers an event with an indication of the querying computer.

It is noted that the sequence respective to FIG. 3A is an exemplary one and may be modified, for example, selection and allocation of a telephone-number may be combined into one operation.

Figure 3B:
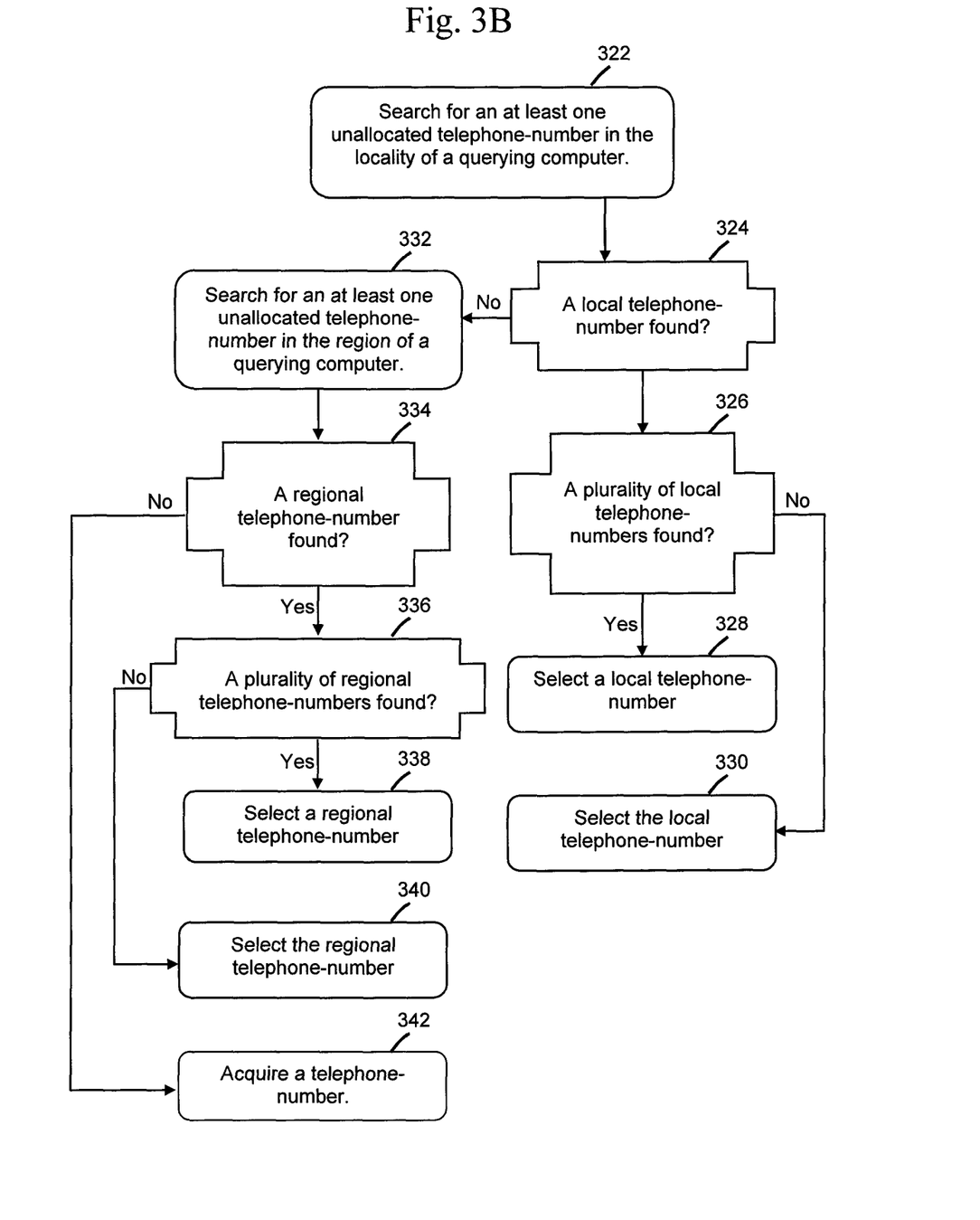
FIG. 3B outlines operations by the service facility for selecting a telephone-number, according to exemplary embodiments of the disclosed subject matter.

FIG. 3B outlines operations by the service facility for selecting a telephone-number, according to exemplary embodiments of the disclosed subject matter.

In operation 322 an at least one unallocated or unused telephone-number in the locality of a querying computer is searched for.

In operation 324 it is determined whether a local unallocated telephone-number is found, and in operation 326 it is determine whether pluralities of local unallocated telephone-numbers are found. In case only one local unallocated telephone-number is found, in operation 330 that one local unallocated telephone-number is selected.

In case a pluralities of local unallocated telephone-numbers are found one local unallocated telephone-number is single out in operation 328 according to criteria such as described below.

In case no local unallocated telephone-number is found, in operation 332 an at least one unallocated or unused regional telephone-number in the region of a querying computer is searched for.

In operation 324 it is determined whether a regional unallocated telephone-number is found, and in operation 336 it is determine whether pluralities of regional unallocated telephone-numbers are found. In case only one regional unallocated telephone-number is found, in operation 340 that one regional unallocated telephone-number is selected.

In case a pluralities of regional unallocated telephone-numbers are found one regional unallocated telephone-number is single out in operation 338 according to criteria such as described below.

In case no regional unallocated telephone-number is found, in operation 342 an at least one unallocated or unused telephone-number accessible for a user of the computer is acquired and selected.

When a plurality of telephone-number are available, such as a plurality of local or regional unallocated telephone-numbers, a telephone-number is singled out from the plurality of telephone-number by employing criteria.

Exemplary non-limiting criteria are:
the least used telephone-number over a given or determined time interval;

the least expensive telephone-number; or the most recently used telephone-number in the locality and/or region of the computer.

Other criteria may be used, including a random selection, as well as a combination of criteria.

Referring with respect to FIG. 3A to a local telephone-number implies, without limiting, a telephone-number of a zone in a vicinity of the computer, such as a town or a district, and referring to a regional telephone-number implies, without limiting, a telephone-number of a geographical of the computer, such as a county or a state.

In some embodiments, the method respective to FIG. 3A is simplified wherein a telephone-number is searched in some geographical area with no refinement for local or regional telephone-number. Optionally or alternatively, the method respective to FIG. 3A is expanded with further refinement for zones such as town, district, county, state or any other geographical hierarchy.

With respect to FIG. 3A, referring to acquiring a telephone-number implies leasing or purchasing a telephone-number such as from a Public Switched Telephone Network (PSTN) or a cellular provider.

It is noted that the sequence respective to FIG. 3B is an exemplary one and may be modified, for example, determining whether a local telephone is found and whether a plurality of local telephone are found may be combined into one operation. It is further noted that other methods may be used for selection of telephone-number. For example, the service facility may cooperate with a PSTN and/or VoIP service which provides the service facility with a telephone-number.

The telephone-numbers discussed above with respect to FIGS. 3A-3B are such that eventually, directly and/or indirectly, a call by the telephone-number can be determined and/or identified by the service facility. For example, the call eventually, directly and/or indirectly, reaches a branch exchange that can be queried or interrogated by the service facility about the call such as of a status thereof, and/or the branch exchange can notify the service facility about the call such as by a status thereof.

In some embodiments, branch exchange 104 and service facility 102 are integrated or combined together, such that branch exchange 104 is a part of service facility 102.

In some embodiments, the communications between computers, such as client computer 110, and a web-site or web-page, such as advertiser's web-page 120, is carried out via the internet.

Optionally or additionally, in some embodiments, other communication techniques are used, such as cellular communication, wherein, optionally, the locality of a computer is obtained by a positioning service of a cellular provider.

In some embodiments, a combination of a plurality of communication techniques is used, for example, a cellular communication between the service facility and the computer and internet between the computer and the web-site.

In some embodiments, instead of and/or in addition to using a telephone to reach an advertiser, other methods may be used, such as emails. For example, the service facility provides a computer with a unique email address that is accessible to the service facility, where the computer displays the unique email address akin to displaying a telephone-number, and the service facility and the computer interact according to the email.

In some embodiments, status of a phone call may comprise information obtained from some resources. For example, voice or mood recognition for particular mood or phrases that can be sent to the computer which, accordingly, may modify the display. Optionally or additionally, the status may further comprise information such as the name or ID of the agent answering the call.

In some embodiments, the advertiser or an entity operating on behalf thereof such as a program and/or and agent may modify the advertiser's web-page, where the change may be identified by the program operating on the computer and the display may be modified accordingly. Optionally or additionally, the advertiser or an entity operating on behalf thereof may send data over the telephone where the data the service facility can detect the data and update the computer which may modify the display accordingly. For example, discussing a price of a product or service, a special offer may be sent over the phone and consequently displayed on the computer.

Figure 4:
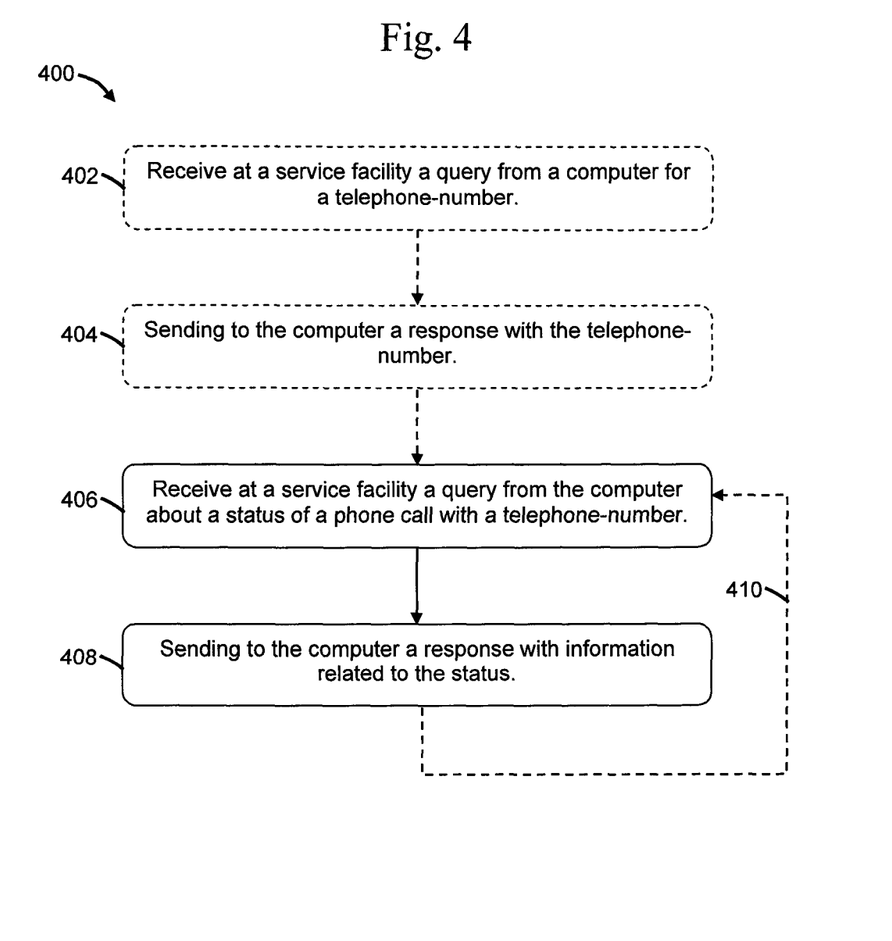
FIG. 4 schematically illustrates operations for correlating a phone call with a telephone-number, according to exemplary embodiments of the disclosed subject matter.

FIG. 4 outlines operations 400 for correlating a phone call with a telephone-number, according to exemplary embodiments of the disclosed subject matter.

In operation 402, essentially an optional operation, a service facility receives a query from a computer for a telephone-number.

In operation 404, correspondingly an optional operation, the service facility sends to the computer a response with the telephone-number.

In operation 406 the service facility receives a query from the computer about a status of a phone call with a telephone-number, the telephone-number optionally obtained in operations 402-404 or similarly or otherwise.

In operation 408 the service facility sends to the computer a response with information related to the status, such as whether the phone call is active and/or the duration of the phone call or any other information respective to the phone call.

Generally, in some embodiments, the service facility is waiting for queries from the computer or other computers and responds correspondingly to the queries.

In some embodiments, the service facility receives repeated queries from the computer, as indicated by an arrow 410, thereby providing the computer with updated information about the status of the phone call.

In some embodiments, the service facility obtains the status of a phone call and/or other data related to the phone call by interacting with a branch exchange to which the call is reached or configured to reach.

Figure 5:
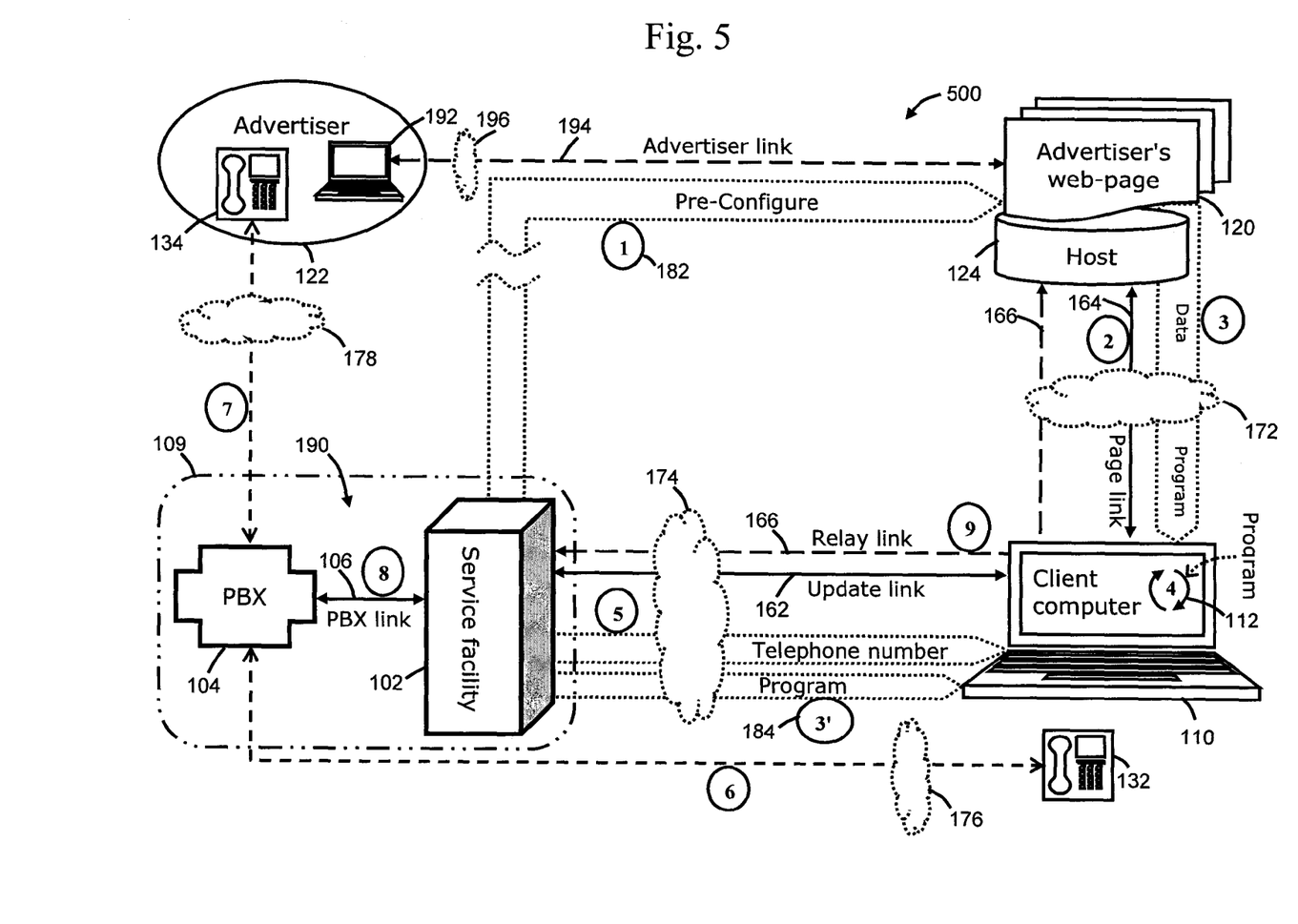
FIG. 5 diagrammatically illustrates an overall view of a scheme for correlating a phone call with a displayed telephone-number and having a link between an advertiser's computer and a web-page, according to exemplary embodiments of the disclosed subject matter.

FIG. 5 diagrammatically illustrates an overall view of a scheme 500 for correlating a phone call with a displayed telephone-number and having an advertiser link 194 between an advertiser's computer 192 and advertiser's web-page 120 via an at least an optional general link as illustrated by a cloud shape 196, according to exemplary embodiments of the disclosed subject matter. It is noted that scheme 500 is similar to scheme 100 of FIG. 1 yet with additional elements for linking the advertiser with the web-page.

The following scenario is provided by way of a non-limiting example for conveying characteristics of an interaction or cooperation between an advertiser, such as an advertiser 122, and a web-page, such as advertiser's web-page 120, hosted on a host computer, such as host 124. In some embodiments, the scenario is modified and/or extended by variations, some of which are indicated thereafter.

When the advertiser receives a call from the user as described above, the advertiser such as an agent of the advertiser or an entity or party operating on behalf of the advertiser or associated with the advertiser, talks and/or otherwise communicates with the user, such as by email or instant messaging. The advertiser establishes the identity of the user or distinguishes the user by the telephone number provided by or via the advertiser, and at least optionally acquires information from the user such as personal details and/or the user's intent or objective and/or any other information.

According to the information provided by the user, the advertiser modifies and/or updates contents of the web-page, such as advertiser's web-page 120, to construct a form with details provided by the user. Consequently, the form is presented on the client computer, either automatically and/or via a program operating therein, such as program 112. Subsequently, the user interacts with the web-page and updates the form in case a correction of an additional detail is needed or required, and acknowledges or accepts the form such as by activating a displayed button and/or a keyboard key thereby imitating a transaction.

Optionally, instead and/or in addition to using advertiser link 194, the advertiser can update the webpage by way of relay link 166.

Below are some non-limiting exemplary variations of the scenario above.

In some embodiments, the user and the advertiser communicate by other means than a telephone. For example, email, instant messaging, VoIP or a video conference over the internet or a combination thereof. Accordingly, the user is identified by other data than the telephone number, such as a unique code provided to the advertiser or by other techniques such as online and/or offline picture of the user face that is presented to the advertiser.

In some embodiments, in exchange for and/or additionally to updating the advertiser's web-page, the user is presented with a different web-page such of a party affiliated with the advertiser, wherein the different web-page optionally comprises links to other locations and/or files.

In some embodiments, in exchange for and/or additionally to the user providing information to the advertiser when communicating therebetween, such as personal details or objectives, the advertiser provides information such as regarding services that the advertiser offers.

In some embodiments, in exchange for and/or additionally to presenting a form to the user by the advertiser's web-page, and that with data provided by the user, data is presented to the user in any manner or arrangement and not necessarily as a form nor for initiation of a transaction. Further, in some embodiments, the data presented to the user is not necessarily data provided by or based on information from and/or of the user, rather, the data may be obtained from the advertiser and/or other sources such as a party associated with the advertiser.

In some embodiments, responsive to interaction of the user with the web-page the web-page is modified and/or switched to another host thereby presenting to the user another web-page. In some embodiments, the other web-page is provided by the advertiser and/or a party operating on behalf and/or affiliated with the advertiser. Optionally the web-pages presented to the user changes or switched in a plurality of times, such that an initial web-page of the advertiser is replaced by that of a party operating on behalf of the party and then switched to a web-page of a marketing party affiliated with the advertiser.

In some embodiments, features of the scenario above and variations thereof are combined. For example, the user calls the advertiser by a telephone number presented to the user by the advertiser's web-page, and responsively the user is presented with a web-page of a party affiliated with the advertiser. As another example, the user calls the advertiser by VoIP and responsively the advertiser modifies the advertiser's web-page and the user is presented with a form for a transaction.

It is noted that in some embodiments or cases the client computer has a capability for performing a telephone call. For example, the client computer comprises a telephone and/or a telephonic apparatus and/or constitutes a telephonic device, such as a smartphone as known in the art and/or industry. Optionally, the client computer is any hand-held or portable device having capabilities and/or facilities of telephonic and/or other communications. Optionally or additionally, the hand-held and/or portable device is operated by a touch-screen.

Thus, by way of a non-limiting example, when the client computer is a smartphone, consequent to the communication between the user and the advertiser the form is presented on the smartphone and in case the form is correct all the user has to do is acknowledge the form such as by tapping his or her finger on the screen of the smartphone.

A potential advantage of the exemplary scenario describe above is single-handedly collaboration with the advertiser. For example, holding the smartphone in one hand, communication with the advertiser and while holding the smartphone in one hand just tapping with a finger, such as the thumb, on the screen of the smartphone without having to manipulate or maneuvering the smartphone or using another hand.

Figure 6:
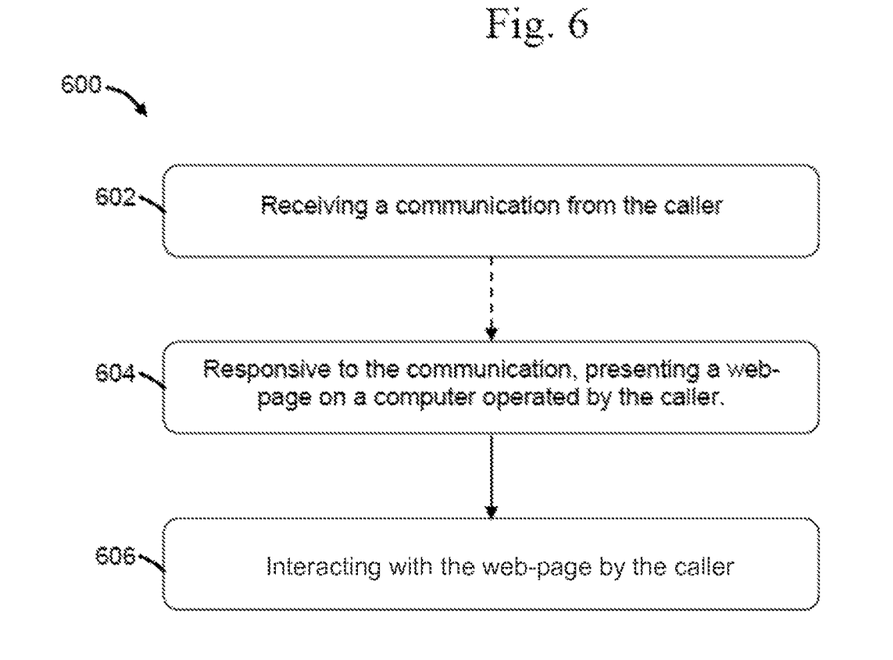
FIG. 6 schematically illustrates operations for collaborating with an advertiser based on correlating a phone call with a telephone-number, according to exemplary embodiments of the disclosed subject matter.

FIG. 6 schematically illustrates operations 600 for collaborating with an advertiser based on correlating a phone call with a telephone-number, according to exemplary embodiments of the disclosed subject matter.

In operation 602 a communication is received by a caller such at a party such as an organization of a service provider.

The caller operates a computerized apparatus having communication facilities, referred also as a client computer, where the computer in some embodiments or some cases is a portable or a hand-held computerized device and in some embodiments or some cases the computer is operated by a touch-screen.

The party receiving the communications is equipped with at least one communication device such as a computer and optionally also a telephone.

The communication by the caller communication is activated or carried out by one or a combination of various techniques, such as telephone, VoIP, email, instant messaging or online chat.

In some embodiments, the caller is identified by the telephone number in case used in calling or by a code that distinguishes the caller such as in case other communication techniques are used.

For example, when using VoIP, when communicating with the party, a unique ID is sent to identify and/or distinguish the caller, and/or when using a telephone the telephone number is in some embodiments presented by or on behalf of the party in a preliminary web-page.

In operation 604, responsive to the communication by the caller, the party receiving the call presents, such as by a computer thereof, a web-page on the client computer operated by the caller where the client computer has a program to view and interact with the web-page such as an internet browser.

In some embodiments, the web-page is of and/or controlled by the party. Optionally, the web-page is of another party associated and/or affiliated by the party.

In operation 606 the caller is interacting with the presented web-page such as by activating a link therein. Optionally, responsive to activating a link and/or another control the web-page is modified and/or switched to another web-page of and/or of another party.

In some embodiments, the interaction is carried out on a plurality of web-pages, optionally the web-pages alternating as described. In some embodiments, results or responses to the interaction are viewed and/or accessed by the party or another party on behalf thereof, where in some embodiments, the interaction constitutes and/or comprises an acknowledgment and/or feedback to the party and/or another party on behalf thereof.

It is noted that the interaction as described above, as for example, in operations 400, may be carried out, at least partially in additions to operations 600.

There is thus provided according to the present disclosure a computerized method for collaborating between a party and a caller, comprising receiving at the party a communication from the caller, and responsive to the communication, presenting by the party an at least one web-page on a computer operated by the caller, wherein the method is performed at least by a computerized apparatus of the party and an at least one communications apparatus of the caller.

In some embodiments, the communication is by at least one of: a telephone, VoIP, an email, an instant messaging, or an online chat, or a combination thereof.

In some embodiments, presenting by the party comprises presenting by at least one of: the party, a second party operating on behalf of the party, or a third party affiliated with the party, or a combination thereof.

In some embodiments, the at least one web-page comprises information provided by at least one of the party or the caller.

In some embodiments, the communication is by a telephone and the caller is identified by a telephone number provided by the party via a preliminary web-page presented on the computer operated by the caller.

In some embodiments, the caller is distinguished by a code provided to the party by the caller.

In some embodiments, the caller interacts with the at least one web-page by the computer operated by the caller.

In some embodiments, the caller further interacts with the party by an at least one additional communication.

In some embodiments, responsive to interacting by the caller, the at least one web-page is at least one of: modified, or switched to another web-page, or a combination thereof.

In some embodiments, the caller interacts in a plurality of phases. In some embodiments, wherein the computer operated by the caller comprises a touch-screen operated device.

In some embodiments, wherein the touch-screen operated device comprises at least one of a smartphone, a tablet computer, or any hand-held device with communication facilities.

In some embodiments, wherein the web-page is presented on the touch-screen operated device is formed for general single-handed operation.

In the context of some embodiments of the present disclosure, by way of example and without limiting, terms such as 'operating' or 'executing' imply also capabilities, such as 'operable' or 'executable', respectively.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable to controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a similar one denotes an apparatus having one or more processors operable or operating according to a program.

As used herein, without limiting, a module represents a part of a system such as a part program operating together with other parts on the same unit, or a program component operating on different unit, and a process represents a collection of operations for achieving a certain outcome.

The term "configuring" and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated operations may occur in deferent order or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein the term "configuring" and/or 'adapting' for an objective, or a variation thereof, implies using materials and/or components in a manner designed for and/or implemented and/or operable or operative to achieve the objective.

Unless otherwise specified, the terms 'about' with respect to a magnitude or a numerical value implies within an inclusive range of −10% to +10% of the respective magnitude or value.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A computerized method for collaborating between a party and a caller, comprising:
   establishing a dynamic updating communication link between computers operated by said caller and said party;
   allocating a unique telephone number only to said caller, the unique telephone number for the caller to reach the party;
   associating the unique telephone number with the caller;
   transmitting a web-page from the party to the caller over the dynamic updating communication link, the web-page including the unique telephone number;
   after associating the unique telephone number with the caller, determining whether a telephone call was made to the unique telephone number within a pre-determined time interval;
   if the telephone call was made within the pre-determined time interval, receiving at the party the telephone call from the caller using the unique telephone number, the unique telephone number uniquely identifying said caller to said party;
   responsive to the telephone call, presenting by the party an at least one updated web-page on said computer operated by the caller, the at least one updated web-page including an order form that is at least partially pre-filled with information provided by the caller on the telephone call, wherein the method is performed at least by a computerized apparatus of the party and at least one of a communications apparatus and the computer operated by the caller; and
   if no telephone call was made to the unique telephone number within the pre-determined time interval, de-allocating the unique telephone number from the caller so that the unique telephone number is available for another use.

2. The method according to claim 1, wherein the telephone call is by at least one of: a telephone, a VoIP, or a combination thereof.

3. The method according to claim 1, wherein presenting by the party comprises presenting by at least one of: the party, a second party operating on behalf of the party, or a third party affiliated with the party, or a combination thereof.

4. The method according to claim 1, wherein the at least one web-page comprises information provided by the party.

5. The method according to claim 1, wherein the caller is identified by a unique identifier comprising the unique telephone number provided by the party via a preliminary web-page presented on the computer operated by the caller.

6. The method according to claim 1, wherein additional information regarding the caller is determined by a unique identifier comprising a code provided to the party by the caller.

7. The method according to claim 1, wherein the caller interacts with the at least one web-page by the computer operated by the caller.

8. The method according to claim 1, wherein the caller further interacts with the party by an at least one additional communication.

9. The method according to claim 7, wherein, responsive to interacting by the caller, the at least one web-page is at least one of: modified, or switched to another web-page, or a combination thereof.

10. The method according to claim 7, wherein the caller interacts in a plurality of phases.

11. The method according to claim 8, wherein, responsive to interacting by the caller, the at least one web-page is at least one of: modified, or switched to another web-page, or a combination thereof.

12. The method according to claim 8, wherein the caller interacts in a plurality of phases.

13. The method according to claim 1, wherein the computer operated by the caller comprises a touch-screen operated device.

14. The method according to claim 13, wherein the touch-screen operated device comprises at least one of a smart-phone, a tablet computer, or any hand-held device with communication facilities.

15. The method according to claim 13, wherein the at least one web-page is presented on the touch-screen operated device is formed for a generally single-handed operation.

16. The method of claim 1, wherein the status indicates whether the telephone call is active.

17. The method of claim 1, further comprising selecting the unique telephone number based on a location of the client.

18. The method of claim 1, further comprising selecting the unique telephone number based on an IP address of the client.

19. The method of claim 1, wherein the at least one updated web-page includes a status of the telephone call.

* * * * *